Sept. 24, 1968        F. C. PETERSON        3,402,763
DEVICE FOR WARMING OR COOLING INFANT FOOD
Filed Dec. 5, 1966
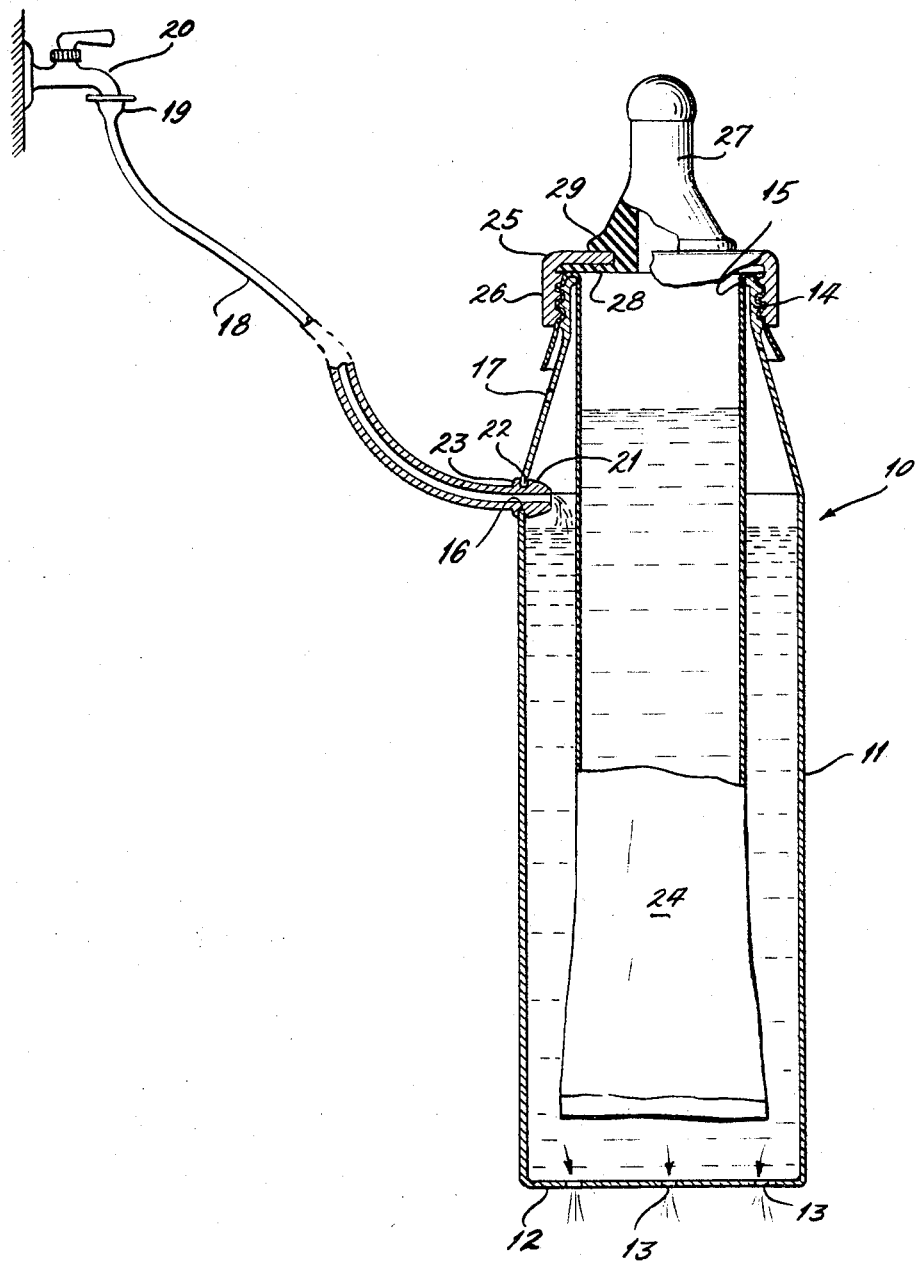
INVENTOR:
FRANCIS C. PETERSON
BY Gravely, Lieder & Woodruff
ATTORNEYS

# United States Patent Office 3,402,763
Patented Sept. 24, 1968

3,402,763
DEVICE FOR WARMING OR COOLING INFANT FOOD
Francis C. Peterson, Affton, Mo., assignor to C. Hager & Sons Hinge Manufacturing Company, St. Louis, Mo., a corporation of Missouri
Filed Dec. 5, 1966, Ser. No. 599,152
6 Claims. (Cl. 165—46)

ABSTRACT OF THE DISCLOSURE

A device for treating infant food contained in thin plastic containers supported in an outer shell by means of a screw-on lid containing a nipple with the open end of the plastic bag positioned between the lid and the shell. The treating arrangement comprises a conduit positioned in a side wall of the shell and connected to a water faucet with openings in the bottom of the shell to permit egress of the warming or cooling water.

---

The present invention relates to a device for warming infant food and particularly relates to a portable device for warming food contained in thin flexible disposable plastic containers.

The principal object of the present invention is to provide a device for warming or cooling infant food in disposable containers wherein the receptacle for the food is a flimsy flexible plastic bag retained in an outer more rigid shell with a nursing nipple and retainer cap on one end of the shell in communication with the open end of the bag.

It is a further object of the present invention to provide a device for warming or cooling infant food containers which has a flexible conduit connected thereto, whereby the device can be hooked to a conventional hot or cold water faucet to provide ready access to means for warming or cooling food in the container.

Still another object of the present invention is to provide a portable device for warming infant food in a flexible container held in a rigid outer shell.

These and other objects and advantages of the present invention will become apparent hereinafter.

Briefly, the present invention comprises a device for warming or cooling infant food including a rigid outer shell having an open top and a bottom with restricted openings and a flexible conduit connected to a side wall whereby warm or cool fluid transmitted through the conduit into the shell will be temporarily retained therein so as to fill the shell to a predetermined height and warm or cool infant food contained in a flexible plastic receptacle positioned within the shell and in communication with a nipple on the open edge of the shell.

The attached drawing is a fragmentary party schematic view partly in section showing the present invention.

The present invention comprises a relatively rigid plastic shell 10 having a continuous vertical side wall 11 and a bottom wall 12 provided with small openings 13 therein. The area of the openings is relatively small, about 3% of the total area of the bottom 12 of the shell 11. The shell 11 is provided with external threads 14 adjacent to an open top 15. A first opening 16 is formed in the side wall 11 and a second small opening 17 is provided in the side wall 11 not substantially below the first mentioned opening 16. The second mentioned opening 17 is for venting air from the hollow shell 10 when fluid is passed into the shell 10 through the opening 16 to allow the fluid to build up inside the shell 10.

A flexible conduit 18 is provided with means on one end for attachment to the opening 16 in the shell wall 11 and means 19 on the other end for attachment to a conventional water faucet 20. The means for attachment of the conduit 18 to the shell opening 16 is deformable and includes an enlarged end section 21 having a tapered nose to facilitate passage of the end section 21 through the opening 16, an annular groove 22 adapted to accommodate the shell wall 11 and an outwardly positioned enlarged retainer lip 23 adapted to be positioned adjacent to the outside surface of the shell 10. This structure retains the conduit 18 securely to the shell 10.

A thin flexible disposable plastic receptacle 24 for infant food is positioned inside the shell 10 and the open end is positioned over the open end 15 of the shell and over the outwardly directed threads 14. A screw-on retainer skirt 26 is screwed onto the end of the shell 10 and retains the plastic receptacle 24 between the shell threads 14 and the cap skirt 26. The cap 25 is provided with a central opening into which is fitted a conventional rubber or plastic nipple 27, which includes a flange 28 positioned beneath the top surface of the cap 25, and an outwardly directed retainer flange 29 positioned adjacent to the top surface of the cap 25. A breather vent normally is provided in the nipple 27.

In operation, the plastic bag 24 is positioned inside the shell 10 with the outermost edges of the bag 24 held against the outer side of the shell 10 by the fingers of the person assembling the device. Suitable infant food then is placed inside the bag 24 and the cap 25 containing the nipple 27 is screwed into place over the shell threads 14. Thus, the cap 25 retains the plastic container 24 filled with infant food in the shell 10. The conduit 18 is snapped into the shell side wall opening 16 and is attached to the faucet 20. If the infant food is cold, warm water then is conducted through the conduit 18 into the shell 10 at a rate of speed sufficient to fill the shell 10 to a predetermined height. This, of course, will depend on the size and number of the openings 13 in the shell bottom 12. The air which was in the shell 10 will be exhausted through the side wall vent 17 to allow the build-up of water inside shell 10. When the contents of the plastic container 24 have been heated to the temperature suitable for feeding to the infant, the faucet is turned off and the water is allowed to flow from the shell 10 through the openings 13 in the shell bottom 12. The shell 10 then is grasped by the mother and is used to feed the infant food in the bag 24 to the infant.

Thus, it is seen that the present invention provides a device which achieves all of the objects and advantages sought therefor.

This invention is intended to cover all changes and modifications of the examples of the invention herein chosen for purposes of the disclosure, which do not constitute departures from the spirit and scope of the invention.

What I claim is:
1. A device for warming or cooling infant food comprising
   (a) a shell having a side wall and an end wall connected to the lower end of the side wall, the upper end of the side wall terminating in a substantially open end, said end and side walls defining a food warming cavity;
   (b) a fluid impervious thin flexible plastic container for infant food positioned in the cavity, said container having an open end;
   (c) an end cap for the shell having a central opening and a nipple positioned therein and means for attaching the cap to the shell, the end margins of the open end of the plastic container being clamped between the open end of the shell and the cap to define a passage from the nipple opening to the inside of the plastic bag;

(d) means on the lower end of the shell permitting limited egress of fluid;
(e) the side wall having an opening for receiving a conduit for transmitting fluid from a source of warm or cool fluid;
(f) a conduit having one end attached to the opening and the other end attachable to a fluid source;
(g) and means for attaching the conduit to the side wall opening.

2. The structure of claim 1 wherein a passage is provided through the side wall of the shell not substantially below the sidewall opening to vent the air in the shell when fluid is transmitted to the shell through the conduit.

3. The structure of claim 1 including means for attaching the conduit to a conventional water tap.

4. The structure of claim 1 including external threads on the shell at the open end, and the cap includes a top portion closing the opening and an internally threaded outer skirt downwardly depending from the cap top portion to engage the shell threads, the end margin of the bag being positioned between the engaged portions of the cap and the shell.

5. The structure of claim 1 including a nipple positioned in the central opening in the cap for feeding infant food from the plastic bag.

6. The structure of claim 1 wherein the conduit is of flexible material and is provided with an enlarged portion on one end, the enlarged portion having a tapered front edge for sliding through the side wall opening, the enlarged portion being of greater size than the shell opening to retain the conduit to the shell, a reduced annular slot behind the enlarged portion for positioning the wall opening and a second enlarged portion adjacent to the reduced slot, said second enlarged portion being greater in size than the wall opening to retain the conduit in the wall opening, and a flexible tubular body connected to the second enlarged portion and terminating in an enlarged receptacle for attachment to a tap.

References Cited

UNITED STATES PATENTS

| | | | |
|---|---|---|---|
| 1,276,943 | 8/1918 | Miniberg | 165—46 XR |
| 1,912,769 | 6/1933 | Hansell | 165—74 XR |
| 2,061,415 | 11/1936 | Acheson | 165—74 |
| 2,595,685 | 5/1952 | Mallory | 165—80 XR |
| 2,717,319 | 9/1955 | Bundy | 165—74 XR |
| 2,837,081 | 6/1958 | Ayers | 126—261 |
| 2,895,718 | 7/1959 | Prather | 165—80 |
| 3,315,734 | 4/1967 | Nadolny | 165—80 |

ROBERT A. O'LEARY, *Primary Examiner.*

M. A. ANTONAKAS, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,402,763

September 24, 1968

Francis C. Peterson

It is certified that error appears in the above identified patent and that said Letters Patent are hereby corrected as shown below:

Column 2, lines 14 and 15, after "retainer" insert -- cap 25 having a downwardly depending internally threaded --.

Signed and sealed this 10th day of March 1970.

(SEAL)
Attest:

Edward M. Fletcher, Jr.
Attesting Officer

WILLIAM E. SCHUYLER, JR.
Commissioner of Patents